June 16, 1931.  O. C. CORDES  1,809,963

CONTROL SYSTEM

Filed May 19, 1928   2 Sheets-Sheet 1

INVENTOR
Oscar C. Cordes
BY
ATTORNEY

June 16, 1931.    O. C. CORDES    1,809,963
CONTROL SYSTEM
Filed May 19, 1928    2 Sheets-Sheet 2
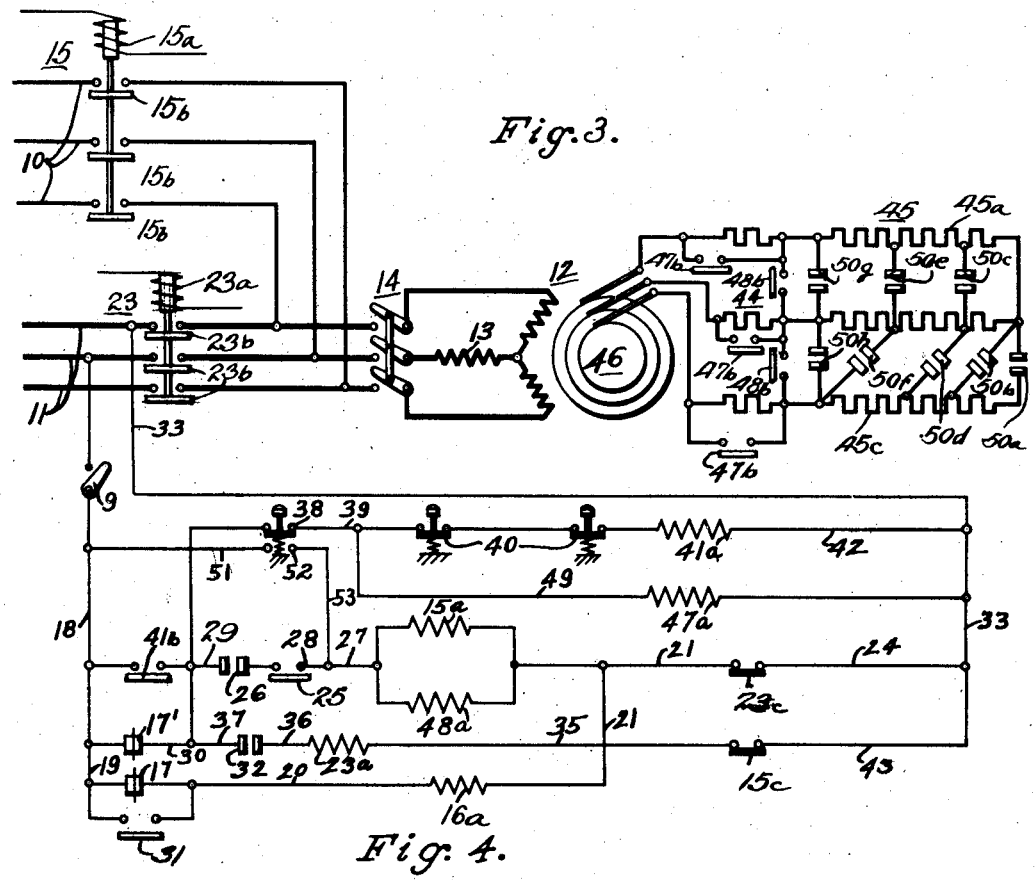
Fig. 3.
Fig. 4.
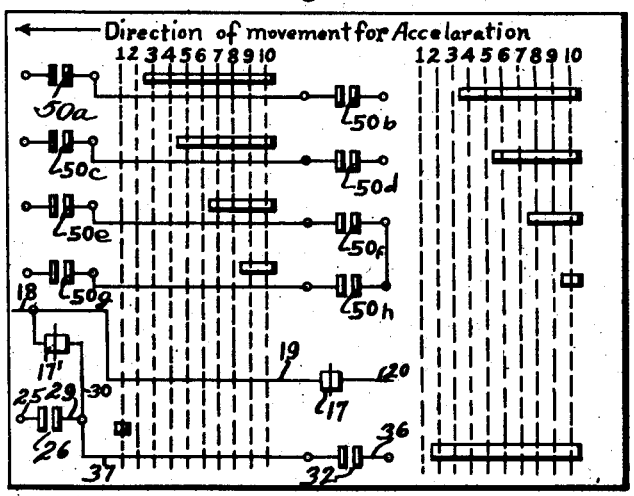
INVENTOR
Oscar C. Cordes
BY
ATTORNEY Patented June 16, 1931

1,809,963

UNITED STATES PATENT OFFICE

OSCAR C. CORDES, OF WILKINSBURG, PENNSYLVANIA, ASSIGNOR TO WESTINGHOUSE ELECTRIC & MANUFACTURING COMPANY, A CORPORATION OF PENNSYLVANIA

CONTROL SYSTEM

Application filed May 19, 1928. Serial No. 279,078.

My invention relates generally to motor-control systems, and particularly to the operation of induction motors from power sources of different frequencies.

In some applications of induction motors, it is common practice to start the motors with power, the frequency of which is low, and to connect them to a source of higher-frequency power for full-speed operation. It will be readily understood by those skilled in the art that motors operating from the higher-frequency power may be regeneratively "braked" by being connected to the lower-frequency power. However, when the motors are connected to loads having large inertia, they may be subjected to excessive shocks upon such transfer from high to low-frequency power.

My invention contemplates the provision of means for reducing the undesirable shocks to a safe value and thereby making practicable the method of braking described.

The object of my invention, generally stated is to provide a control system for an induction motor in which the motor may be operated from a plurality of power sources having different characteristics.

A more specific object of my invention is to provide for regeneratively braking an induction motor by connecting it to a source of lower-frequency voltage than that under which it has been operating.

Another object of my invention is to provide for limiting the regenerative-braking effect in a motor when the synchronous speed is changed from a high to a low value.

A further object of my invention is to provide for connecting a resistor into the secondary circuit of an induction motor upon the establishment of regenerative-braking connections, and to thereby limit the regenerative-braking effect.

Other objects of my invention will become apparent to those skilled in the art when the following description is considered in connection with the accompanying drawings, in which:

Fig. 3 is a schematic straight-line diagram of the connections for a control system, as illustrated in Fig. 1;

Fig. 4 is a drum development of a typical master controller for effecting the switching operations in connection with the control system shown in Figs. 1 and 3.

The purpose of the invention is to limit motor torque during dynamic or regenerative braking to a valve that is safe for the mechanical equipment. It has been found when the motor is disconnected from a relatively high-frequency source, and connected to a relatively low-frequency source, as from 60 cycles to 6 cycles, with the secondary windings of the motor short circuited, the braking torque increases during a large part of the braking operation, as shown on curve "$a$" in Fig. 2, the peak value being several times the normal motoring torque. When machinery having a high value of inertia is connected to the motor, there is danger of injuring bearings, shearing a shaft, or otherwise doing damage to the mechanical parts of the equipment.

Figure 2:
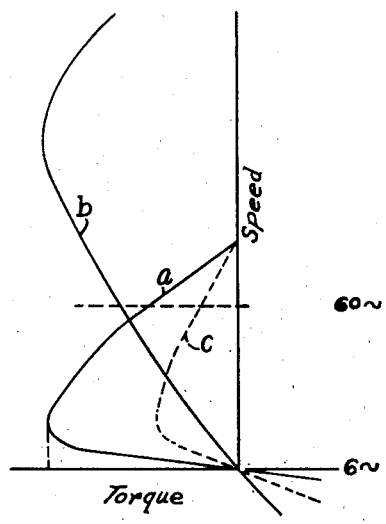
Fig. 2 shows a plurality of speed-torque-characteristic curves for an induction motor, distinguishing between the braking characteristics of a motor operated in accordance with my invention and the braking characteristics of a motor as normally operated.

The maximum braking torque may be reduced either by introducing sufficient resistance into the secondary circuit of the motor to produce a speed-torque characteristic corresponding to the curve "$b$" in Fig. 2, or by reducing the voltage applied to the motor primary, thus producing the characteristic represented by the curve "$c$". The three curves $a$, $b$ and $c$ of Fig. 2 represent torque-speed curves of the motor when connected to the low-frequency or 6-cycle-current supply and operating above synchronous speed. The curve "$a$" represents the conditions where normal low-frequency voltage is applied to the motor primary, and the motor secondary is short circuited. If the voltage applied to the motor primary is reduced, the curve retains the same general shape, but the values of torque are lessened, as shown in curve "c". If the voltage applied to the primary winding of the motor is maintained at its normal value, but resistance is introduced into the secondary circuit of the motor, the curve retains the same general shape as curve "a", given values of torque corresponding, however, to greater frequencies, thus moving the peak of the curve upwardly. By choosing resistance for the secondary of such value that the peak of the curve is considerably above the 60-cycle point, the maximum value of torque will be at that speed value, and the torque will reduce as the motor speed approaches the 6-cycle value. The maximum value of torque on the curve b, between 60-cycle and 6-cycle, is considerably less than that on curve a.

An induction motor 12 is provided with a primary winding 13 and a secondary winding 46, and is disposed to be connected, by means of a switch 14 and one of two contactors 15 and 23, to either a low-frequency source of supply 10 or a high-frequency source of supply 11. The induction motor 12 may be started with its primary winding connected to the 6-cycle source of power 10 through the line switch 15 and, after it has reached its normal speed for this frequency, may be transferred to the 60-cycle source of supply 11 through the line switch 23. The induction motor 12 is of the wound-rotor type and has a secondary winding 46 that is connected to two banks of resistors 44 and 45. The bank of resistors 44 will be short-circuited during the acceleration and power operation of the induction motor 12, and will be utilized for braking purposes only, as will be described hereinafter. The bank of resistors 45 are utilized to facilitate the acceleration of the induction motor 12 after its connection to the high-frequency source of power 11. Sections of the bank of resistors 45 are short-circuited, in a manner well-known in the art, through the operation of the switches 50 by the master controller shown in Fig. 4.

When, during acceleration of the motor, the primary winding 13 of the induction motor 12 is connected to the low-frequency source of supply 10, the switches 47 and 48 are held in their closed positions, thus maintaining the secondary winding 46 short-circuited.

The line switch 15 is electro-magnetically operated, and a circuit for energizing its operating coil is completed upon the closure of the control switch 9 and the actuation of the master controller to its first accelerating position to close the contact members 26. This energizing circuit may be traced from the 60-cycle source of supply 11 through conductor 24, interlocking contact member 23c of the line switch 23, conductor 21, the operating coil 15a of line switch 15, conductor 27, conductor 28, contact members 25 of the relay 16, contact members 26, contact members 41a of the low-voltage relay 41, conductor 18, switch 9, to the middle conductor of the supply line 11.

The operating coil of the contactor or line switch 23 is energized by a circuit which is controlled by the contact members 32 of the master controller. As indicated in Fig. 4, the contact members 32 are actuated to their closed position when the master controller reaches its second accelerating position and remain in their closed position during the remainder of the accelerating steps and during the high-speed operation of the induction motor 12.

The energizing circuit for the line switch 23 may be traced from the conductor 33, through conductor 43, interlocking contact members 15c of the line switch 15, conductor 35, the operating coil 23a of the line switch 23, conductor 36, contact members 32, conductor 37, conductor 29 and the contact members of the low-voltage relay 41, to the energized conductor 18.

The relays 16 and 41 are actuated to their circuit-closing positions upon the closure of the control switch 9, if the master controller is in its "off" position. The reset devices 17 and 17' are in their circuit-closing positions only when the master controller is in its "off" position, as shown in Fig. 4. When the control switch 9 is actuated to its circuit-closing position, with the master controller in its "off" position, an energizing circuit for the low-voltage relay 41 is established which may be traced from the supply line 11 through conductor 33, conductor 42, the operating coil 41a of the voltage relay 41, stopping push-button switches 40, conductor 39, braking push-button switch 38, conductor 29, conductor 30, the reset device 17', conductor 18, control switch 9, to the supply line 11. The low-voltage relay 41 is thereby actuated into its circuit-closing position in which its contact members close a circuit in shunt relation to the reset device 17', thus completing a holding circuit for the low-voltage relay 41 when the position of the master controller is advanced, and the reset device 17' thereby actuated to its circuit-interrupting position.

It will be observed from the diagrams of connections that the operating coil of the contactor 47 is connected, in parallel-circuit relation, to the operating coil of the low-voltage relay 41 and the stop switches 40. The operating coil of the contactor 47 will, therefore, be energized and the contactor 47 be actuated into its circuit-closing position simultaneously with the low-voltage relay 41. The energizing circuit for the contactor 47 may be traced from the energized conductor 33 through the operating coil of the contactor 47, conductor 49, through conductor 39, etc., as traced for the energizing circuit of the low-voltage relay 41. The contactor 47 is, therefore, actuated into its circuit-closing position prior to the operation of the induction motor 12 and is maintained in this position during the operation of the induction motor 12.

Another circuit is established simultaneously with that described above when the control switch 9 is actuated to its circuit-closing position, with the master controller in its "off" position, which energizes the operating coil of the relay 16 to effect its closure. This circuit may be traced from the energized conductor 24, through the interlocking contact member 23c of the line switch 23, conductor 21, the operating coil 16a of the relay 16, conductor 20, reset device 17 and conductor 19, to the energized conductor 18.

When the relay 16 is actuated to its circuit-closing position, the contact member 31 is actuated to close a holding circuit in shunt relation to the reset device 17, so that, as the position of the master controller is advanced from its "off" position through successive motor-operating positions, actuating the reset device 17 to its open position, the relay 16 will be maintained in its closed position.

The reset devices 17 and 17' are provided on the master controller to necessitate the return of the master controller to the "off" position before the induction motor 12 may be restarted, should the supply of energy to the primary winding 13 of the induction motor 12 be interrupted. The reset devices 17 and 17' are in their circuit-closing positions only when the master controller is in its "off" position, and control the initial energization of the operating coils for the low-voltage relay 41, the relay 16, and the switch 47.

The contact members 26 and 32 are operated by the master controller, the contact members 26 being actuated to their closed positions to effect the operation of the line switch 15, and connect the primary winding 13 of the induction motor 12 to the low-frequency source of power 10. As seen from the drum development of the master controller in Fig. 4, the contact members 26 remain in their circuit-closing positions only during the first accelerating step of the master controller.

The contact members 32 are actuated to their circuit-closing positions by the master controller upon the second accelerating step and remain in their circuit-closing positions throughout the further acceleration of the motor and during its operation from the high-frequency source 11. The contact members 32 are operated to effect the actuation of the line switch 23 and connect the primary winding 13 of the induction motor 12 to the high-frequency source of power 11 upon the release of the line switch 15 to its circuit-interrupting position, disconnecting the primary winding 13 from the low-frequency source of power 10.

A plurality of "stopping" push-button switches 40 are provided in the vicinity of the induction motor 12 and its driven machinery, and the operation of the induction motor 12 may be interrupted by the actuation of any of these "stopping" push-button switches 40. The push-button switches 40, upon being actuated, interrupt the circuit to the low-voltage relay 41 which drops to its circuit-opening position and interrupts the circuits to the contactor 15 or the contactor 23, thus stopping the motor.

A braking push-button switch 38 is provided to simultaneously interrupt the supply of energy from the high-frequency source 11 to the primary windings 13 of the induction motor 12, connect the primary windings 13 to the low-frequency source of power 10, and effect the operation of the switch 47 to its circuit-interrupting position, thereby connecting the bank of resistors 44 in circuit with the secondary winding 46 of the induction motor 12.

When an operator desires to start the operation of the induction motor 12, the main switch 14 is actuated to its circuit-closing position, connecting the primary winding 13 of the induction motor 12 to its source of supply. The switch 9 may then be actuated to its circuit-closing position to energize the supply conductors for the control system and supply power to the operating coils of the low-voltage relay 41, relay 16 and the switch 47, actuating them to their closed positions, in the manner described above.

The master controller may then be advanced to the first accelerating position, thus closing a circuit through the contact members 26, which actuates the line switch 15 and the short-circuiting switch 48 to their circuit-closing positions. These circuits may be traced from the energized conductor 18, through the contact members of the low-voltage relay 41, conductor 29, contact members 26, contact members 25 of the relay 16, conductor 28, by conductor 27 to the parallel-connected operating coils of the switches 15 and 48, conductor 21, interlocking contact members 23c, to the energized conductor 24. The line switch 15 is thereby actuated to its circuit-closing position, connecting the primary winding 13 to the low-frequency source of supply 10. Simultaneously with the closure of the line switch 15, the switch 48 is actuated into its circuit-closing position, short-circuiting the bank of resistors 45 and allowing the induction motor 12 to accelerate on the low-frequency supply, with its secondary winding 46 short-circuited through the contact members of the switches 47 and 48.

When the induction motor 12 has reached the maximum speed attainable with the low-frequency connection, the master controller may be advanced to the second notch in which the contact members 26 will be released to their circuit-interrupting position, and the contact members 32 will be actuated to their circuit-closing position, thereby interrupting the supply of energy to the operating coils 15a and 48a of the switches 15 and 48 and establishing a circuit for energizing the operating coil 23a of the line switch 23. Upon the release of the line switch 15 to its circuit-interrupting position, to disconnect the primary winding 13 from the low-frequency source of supply 10, a circuit is completed for energizing the operating coil of the switch 23 and may be traced from the energized conductor 33, through conductor 43, interlocking contact member 15c, conductor 35, the operating coil of the line switch 23, conductor 36, contact members 32, conductor 37, conductor 29 and the contact members of the low-voltage relay 41, to the energized conductor 18. The interlocking arrangement between the switches 15 and 23 is such that the primary winding 13 cannot be connected to both sources of supply 10 and 11 at the same time, since the switch 15 must be in its open position to complete an energizing circuit for the line switch 13 and connect the primary windings 13 to the 60-cycle source of supply 11.

Further acceleration of the induction motor 12 is accomplished through the operation of the master controller to operate the switches 50a to 50h, inclusive, shunting out sections of the resistor 45, in a manner well-known in the art, to gradually establish a short-circuited secondary winding 46.

When it is desired to stop the operation of the induction motor 12, any of the "stop" push-button switches 40 may be actuated to their circuit-interrupting position, thereby interrupting the circuit which supplies energy to the operating coil of the low-voltage relay 41 and releasing its contact members to their circuit-interrupting positions. Upon the release of the low-voltage relay 41 to its circuit-interrupting position, all the energizing circuits which extended through the contact members of the low-voltage relay 41 are interrupted and the corresponding switches released to their circuit-interrupting positions.

In this way, if the motor 12 is being operated from the high-frequency source of supply 11, the release of the low-voltage relay 41 will interrupt the supply of energy to the operating coil of the line switch 23 and it will be released to its open position, thereby interrupting the circuit between the primary winding 13 and the source of supply 11. In this case, the motor 12 drifts to standstill, it being retarded only by friction of the driven machinery.

When it is desired to stop the induction motor 12 suddenly, the operator may actuate the "braking" push-button switch 38 and thereby effect the release of the switch 23 and establish a circuit for the operating coils of the switches 15 and 48 so that the primary winding 13 is connected to the low-frequency source of supply 10 which corresponds to a synchronous speed of the motor which is much less than that of the source 11, and produces a braking torque represented in Fig. 2 by curve "b".

The energizing circuit for the switches 15 and 48 may be traced from the energized conductor 18, through conductor 51, contact members 52 of the braking push-button switch 38, conductor 53, by conductor 27 to the parallel-connected operating coils of the switches 15 and 48 by conductor 21 and the interlocking contact member 23c to the energized conductor 24. The switch 48, therefore, short-circuits the bank of resistors 45 simultaneously with the connection of the primary winding 13 to the 6-cycle source of supply 10 upon the closure of the line switch 15.

As pointed out hereinbefore, the speed-torque curve "a" of Fig. 2 represents an undesirable braking characteristic which may be modified to a more desirable braking characteristic "b" by the connection of a resistor of suitable value into the secondary circuit of the induction motor 12 when transferred from the high-frequency to the low-frequency source of supply. The bank of resistors 44 has been so selected that its value of resistance is such that, when connected into the primary circuit for braking the induction motor 12, as described above, the resulting characteristic curve will be substantially like the curve "b" of Fig. 2.

Upon the actuation of the braking push-button switch 38, the circuit supplying energy to the coil 47a of the switch 47 is interrupted simultaneously with the circuit supply energy to the operating coil of the low-voltage relay 41, so that, upon the release of the line switch 23 to its open position, and the actuation of the line switch 15 to its closed position for braking, the bank of resistors 44 is open-circuited by the release of the switch 47 to its open position, and a short-circuit connection is established between the banks of resistors 44 and 45 by the switch 48. In this way, when it is desired to brake the induction motor 13, a transfer of connections is effected to establish a circuit supplying the low-frequency power to the primary winding 13 and connect the secondary winding 46 through the bank of resistors 44. A sudden but not excessive braking torque is obtained in this way, which retards the induction motor 12 to a speed corresponding to synchronous speed at the low frequency without damaging the operating parts of the induction motor 12 or its driven machinery.

Figure 1:
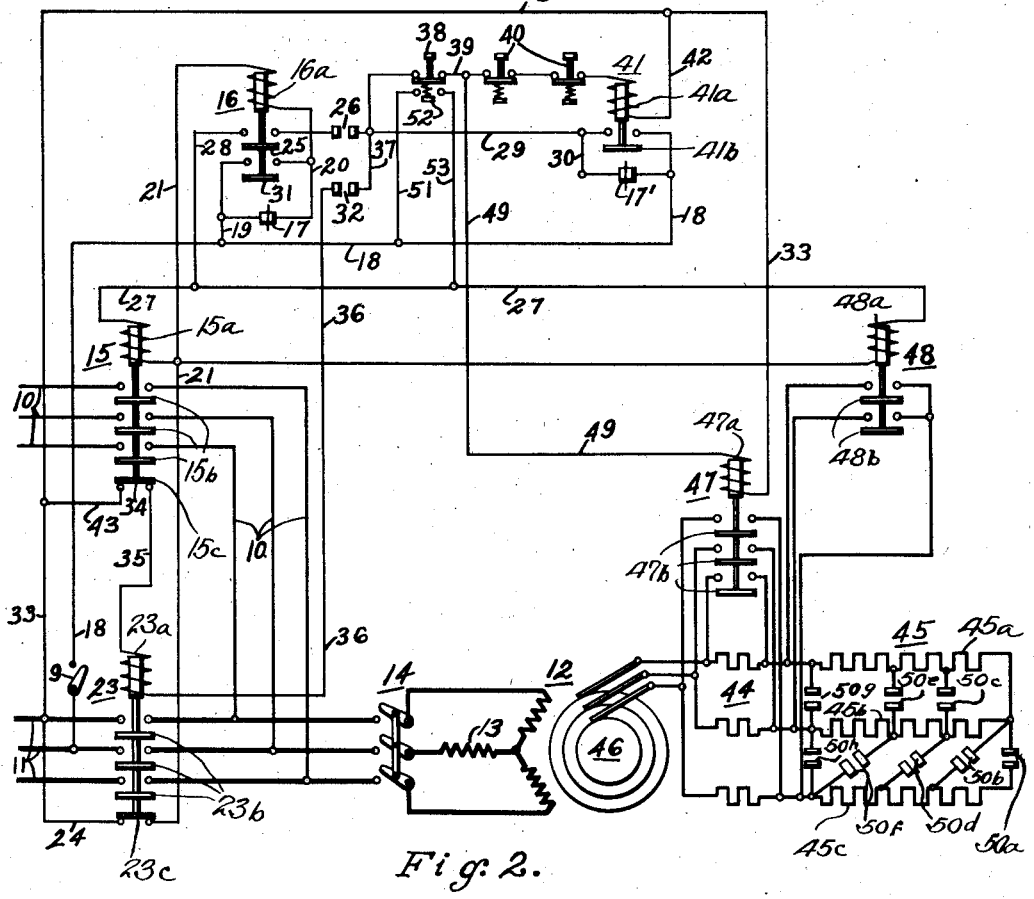
Figure 1 is a diagrammatic view of a control system for an induction motor, the elements of which are connected in accordance with one embodiment of my invention.

It will be apparent from the circuits shown in Figs. 1 and 3, that, when the switch 15 is in its circuit-closing position, it is impossible to energize the operating coil of the line switch 23, since the interlocking contact member 15c of the line switch 15 is then in its circuit-interrupting position. Similarly, when the line switch 23 is in its circuit-closing position, the energizing circuit for the switches 15 and 48, and relay 16 is interrupted by the interlocking contact member 23c of the line switch 23 which is then in its circuit-interrupting position.

When the induction motor 12 has been stopped and the operator desires to re-start it, the master controller must be returned to its "off" position. When the master controller is in its "off" position, the reset devices 17 and 17' are in their circuit-closing positions, thereby establishing circuits to energize the operating coils of the relay 16 and 41, and the switch 47, as described above. Since it is impossible to effect a connection which will complete a circuit for the operating coils of these relays until the reset devices 17 and 17' are in their closed positions, as shown throughout the figures, the master controller must, at all times, be returned to the "off" position when the operation of the induction motor 12 is interrupted, or, more specifically, when the low-voltage relay 41 is released to its circuit-interrupting position. After the master controller has returned to its "off" position, and the relays 16, 41 and 47 have been actuated into their closed positions, the master controller may be advanced, through the accelerating steps, to bring the induction motor up to its operating speed, exactly as described hereinbefore.

Since it will be possible to modify the embodiment set forth and adapt it to numerous applications without departing from the spirit and scope of the invention, it is intended that the foregoing description shall be construed as merely illustrative and not in a limiting sense.

I claim as my invention:

1. In a control system for an alternating-current motor having a primary and a secondary winding, a plurality of power sources having different frequencies, a plurality of resistor banks connected to the secondary winding, one of said resistor banks being bridged during normal operation of the motor, and means operable to institute a braking operation comprising means for transferring the connection of the primary winding from one power source to another power source of lower frequency and simultaneously removing the bridging connection from the one resistor bank and short-circuiting the other bank of resistors, thereby to control the braking torque developed by the motor.

2. In a braking control for an induction motor, in combination, an induction motor provided with stator and rotor windings, a high-frequency and a low-frequency source of power for the motor, a braking resistor connected to the rotor circuit, said resistor being ineffective during the starting and normal operation of the motor when connected to the high-frequency power source, means operable to transfer the stator connection from the high-frequency to the low-frequency winding while the motor is in operation to effect a braking operation, and means responsive to the operation of the transfer means for rendering said braking resistor effective to limit the current flowing in the rotor windings, thereby to control the braking torque developed by the motor.

3. In a control system for an alternating-current motor having a primary and a secondary winding, a plurality of power sources having different frequencies, means for regeneratively braking the motor comprising means for transferring the connection of the primary winding from one power source to another power source of lower frequency, and means responsive to the operation of said transfer means for automatically changing and maintaining the resistance of the secondary circuit of the motor at a predetermined value to limit the braking torque to a predetermined maximum.

4. In a control system, an alternating-current motor having a stator winding and a rotor winding, two sources of alternating current having different frequencies, means for connecting said stator winding to said sources of power, a dynamic-braking resistor and an accelerating resistor connected to said rotor winding, control means for starting the motor comprising means operative to first connect the motor to the lower-frequency source with the dynamic-braking resistor and the accelerating resistor short-circuited, to then connect the motor to the higher frequency source with the accelerating resistor in the rotor circuit, and to thereafter remove the accelerating resistor from the rotor circuit, and means for short-circuiting the accelerating resistor and for introducing the dynamic-braking resistor into the rotor circuit when the motor is disconnected from the high-frequency source and connected to the low-frequency source.

5. In a control system, an alternating-current motor having a stator winding and a rotor winding, a low-frequency source and a high-frequency source of alternating current for operating said motor, a dynamic-braking resistor and an accelerating resistor connected to said rotor winding, a controller for governing the action of said motor, means for normally closing a circuit in shunt relation to said dynamic-braking resistor, and means, operable when the motor is operating from the high-frequency source, for connecting the motor to the low-frequency source, introducing the dynamic-braking resistor into the motor circuit, and short-circuiting the accelerating resistor.

6. In a control system for an induction motor provided with stator and rotor windings, high-frequency and low-frequency power sources for the motor, an accelerating resistor for the motor, means including a controller operable to successively connect the stator windings to the low-frequency and high-frequency power sources, a switch responsive to the operation of said controller disposed to shunt the accelerating resistor so long as the stator is connected to the low-frequency power source and to render said resistor effective when the transfer of the stator connection is effected, a braking resistor, means operable to institute a braking operation, said means being disposed to effect a retransfer of the stator connection to the low-frequency power source and the short-circuiting of the accelerating resistor, and means responsive to the operation of the means for instituting a braking operation for connecting the braking resistor in the rotor circuit thereby to control the regenerative braking effect.

7. In a motor-control system, in combination, a motor, a dual-frequency source of power for the motor, a starting resistor for the motor, means operable to start the motor disposed for initially energizing the motor with power of low frequency with the starting resistor short-circuited and subsequently energizing the motor from the high-frequency power source with the starting resistor rendered effective, means independent of the starting means operable to reconnect the motor to the low-frequency power source, and means responsive to said reconnecting means to short-circuit a portion of the starting resistor to provide a predetermined value of effective resistance in the motor circuit, thereby to cause the motor to develop a predetermined braking torque.

8. In a motor-control system, comprising in combination, an induction motor provided with a stator winding and a wound-rotor winding, a plurality of sources of power each having different frequencies, line switches for connecting the stator winding to either power source, a braking resistor and an accelerating resistor connected to the rotor windings, a shunting switch for the braking resistor, a switch connected between said resistors for short-circuiting the accelerating resistor, control means for starting the motor, said control means being operable to initially connect the stator winding to the low-frequency power source and simultaneously effect the closure of the resistor-shunting and short-circuiting switches, said control means being further operable to connect the stator winding to the high-frequency power source and effect the opening of the resistor-shunting switch being unresponsive to the second controller operation, and auxiliary control means operable to institute a braking operation, said means being disposed to reconnect the stator winding to the low-frequency-power source and effect opening and closing operations of the resistor-shunting and short-circuiting switches respectively thereby to produce a predetermined variation in the braking torque developed by the motor.

9. In a motor-control system, in combination, a motor provided with primary and secondary windings, a high-frequency and a low-frequency source of power for the motor, line switches for connecting the motor to either power source, a starting resistor and braking resistor, said resistors having their several elements connected in series-circuit relation and to the secondary winding of the motor, a bridging switch for the braking resistor, a short-circuiting switch for the starting resistor, a controller for governing the operation of the line switches and the short-circuiting switch, said controller being provided with contact members disposed to bridge different sections of the starting resistor in response to predetermined movements of the controller, a control circuit for the several switches, said bridging switch being energized and closed in response to the energization of the control circuit, said controller being initially operable to effect the operation of the line switch to connect the motor to the low-frequency power source and the closing of the short-circuiting switch to render the starting resistor ineffective, secondly to effect the opening of said switches and the closure of the other line switch to connect the motor to the high-frequency power source with the starting resistor in the secondary-winding circuit, and further operable to effect bridging operations of the starting resistor to accelerate the motor, and means operable independently of the controller for reconnecting the motor to the low-frequency power source, short-circuit the starting resistor and effect the opening of the bridging switch for the braking resistor, thereby to cause the motor to develop a predetermined braking torque.

In testimony whereof, I have hereunto subscribed my name this 9th day of May, 1928.

OSCAR C. CORDES.